US 6,679,541 B1

(12) United States Patent
Hanser et al.

(10) Patent No.: US 6,679,541 B1
(45) Date of Patent: Jan. 20, 2004

(54) CHAIN DRIVEN LINKAGE ASSEMBLIES FOR ROOM EXTENSIONS

(75) Inventors: Paul Edmund Hanser, Tipton, IA (US); Stacy Hanser, Davenport, IA (US)

(73) Assignee: HWH Corporation, Moscow, IA (US)

( * ) Notice: Subject to any disclaimer, the term of this patent is extended or adjusted under 35 U.S.C. 154(b) by 0 days.

(21) Appl. No.: 10/248,379

(22) Filed: Jan. 15, 2003

(51) Int. Cl.[7] .................................................. B60P 3/34
(52) U.S. Cl. ........................ 296/171; 296/172; 296/175; 296/26.12; 296/26.14
(58) Field of Search ................................. 296/156, 165, 296/171, 172, 173, 175, 26.01, 26.12, 26.13, 26.14

(56) References Cited

U.S. PATENT DOCUMENTS

| 3,582,130 A | 6/1971 | Borskey |
| 3,619,001 A | 11/1971 | Borskey |
| 3,924,889 A | 12/1975 | Gogush |
| 4,981,319 A | 1/1991 | Gerzeny et al. |
| 5,078,441 A | 1/1992 | Borskey |
| 5,366,266 A | 11/1994 | Harbison |
| 5,857,733 A | 1/1999 | Dewald, Jr. et al. |
| 6,152,520 A | 11/2000 | Gardner |
| 6,325,437 B2 | 12/2001 | Hiebert et al. |

*Primary Examiner*—Dennis H. Pedder
*Assistant Examiner*—Patricia L. Engle
(74) *Attorney, Agent, or Firm*—James C. Nemmers

(57) ABSTRACT

A push-pull drive chain mechanism and scissors linkage assembly powered by a hydraulic cylinder to affect the coordinated, linear movement of an expandable room in a recreational vehicle. The drive chain moves generally vertically along a first structural member, such as a vehicle frame member, as the hydraulic cylinder extends or retracts to move the expandable room relative to the vehicle frame. The drive chain is pivotally connected at the proper place on the scissors-type linkage assembly, the links that form the scissors extending and crossing for pivotal attachment to a structural member of the vehicle body and a structural member of the expandable room. The drive chain is constructed and guided to provide the required force for opening and closing the scissors assembly.

7 Claims, 4 Drawing Sheets

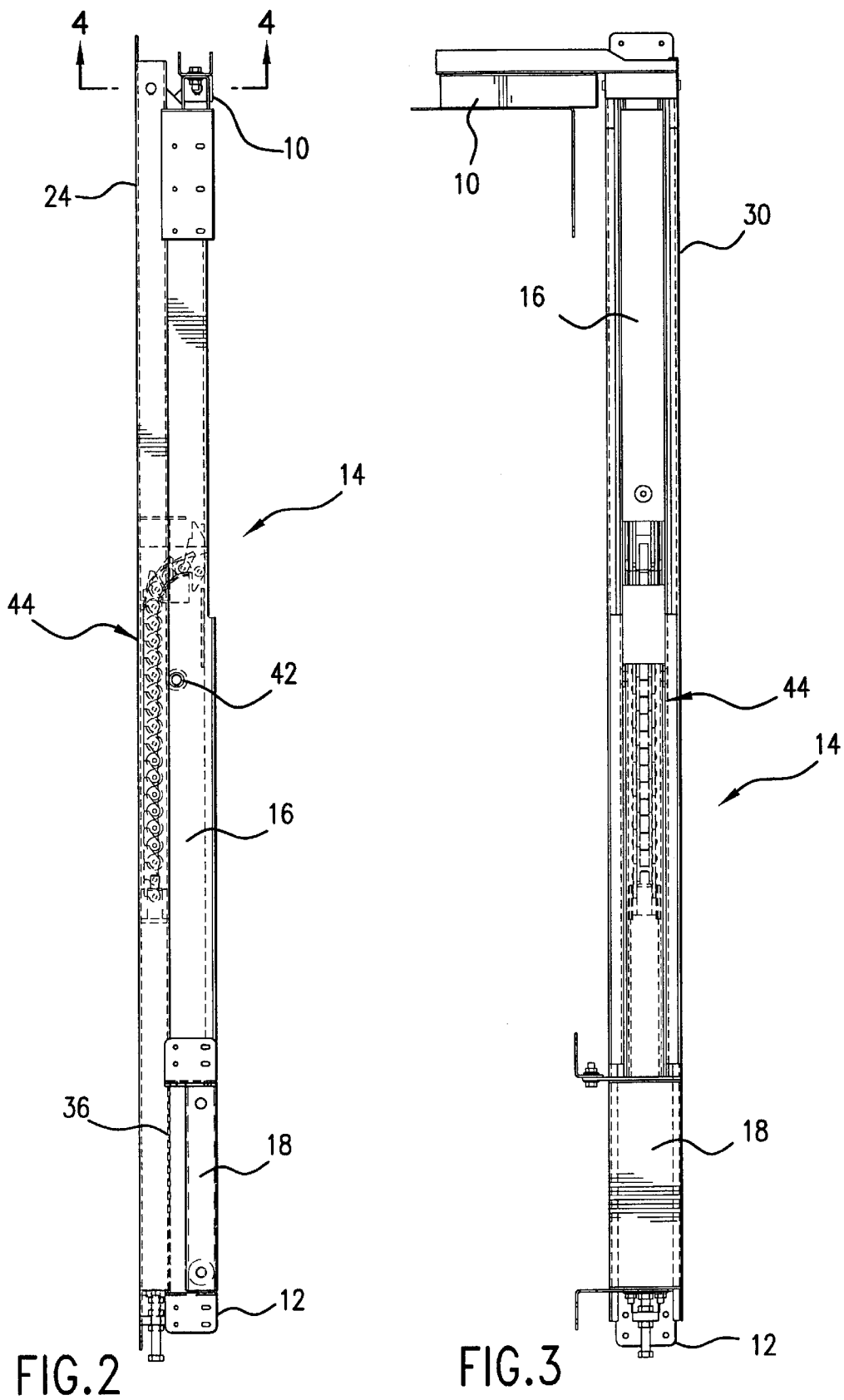

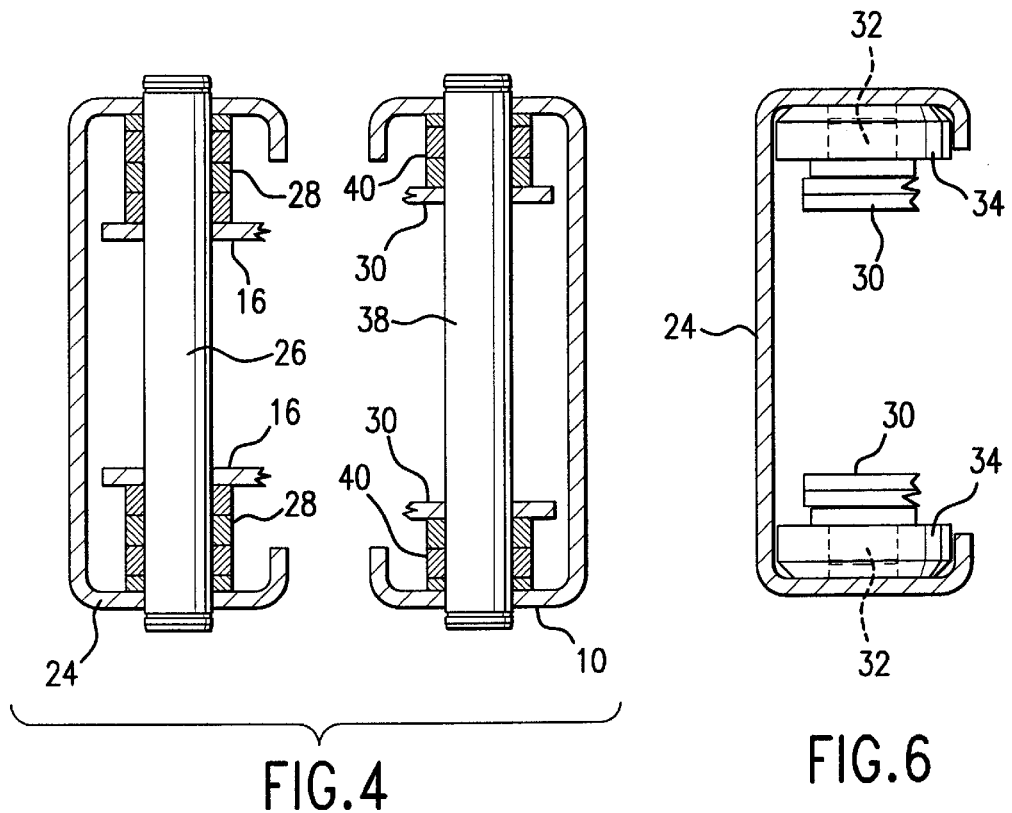
FIG.4
FIG.6
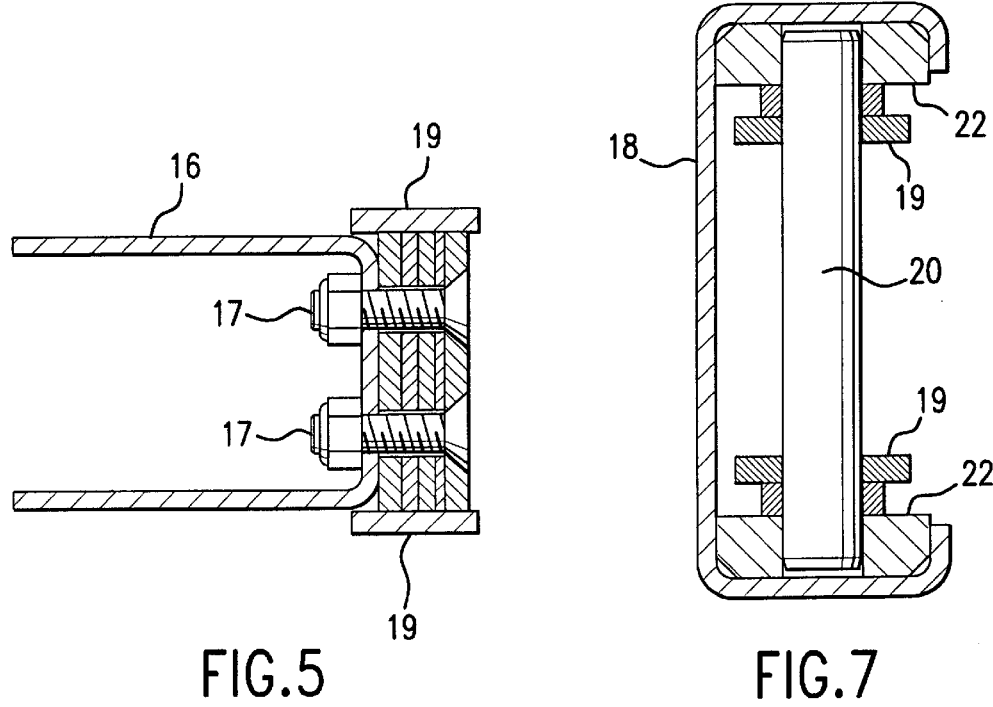
FIG.5
FIG.7

CHAIN DRIVEN LINKAGE ASSEMBLIES FOR ROOM EXTENSIONS

BACKGROUND OF INVENTION

The invention relates to a linkage arrangement for moving members together or apart in a substantially linear motion without a substantial shift in a direction perpendicular to the desired linear motion. Typical linkages that are commonly used for a variety of purposes involve a pair of parallel members attached pivotally to a pair of parallel linkage members to form a parallelogram. If one of the parallel members is fixed, then motion of the parallelogram linkage results in an angular motion—in or out and up or down rather than simply in or out. The present invention relates to a linkage arrangement of the "X" or scissors type for moving members relative to one another in a substantially linear motion.

The invention disclosed herein is particularly useful as a control mechanism for expandable rooms in habitable structures, especially room structures that are telescopically slideable between retracted and extended positions for motorized or towed vehicles. A variety of recreational vehicles are known and used that have a room or a room portion that may be moved from a retracted position while the vehicle is moving over the road to an extended position when the vehicle is stationary in order to provide additional internal space. This type of an arrangement provides adequate space to accommodate users when a recreational vehicle is parked for habitation while still keeping the vehicle within governmental regulations that impose width limitations for vehicles on roads and highways. When these vehicles are stationary, they are frequently used for habitation for extended periods of time, and when so used, it is highly desirable to be able to maximize the available living space. This is done in a variety of ways in which the user can move a "nested" portion of the expandable room out to its extended or expanded position, typically under hydraulic or electrical power.

These expandable room portions usually comprise a structure that includes a floor, a roof, an external end wall (typically generally parallel to the vehicle side wall), an open (or openable), interior end wall, and one or more side walls (typically generally perpendicular to the vehicle side wall). These components are typically made of frame members and wall panels. In the retracted position, the roof, floor and side walls are typically concealed from exterior view and the room exterior end wall forms a portion of the vehicle side wall. A large factor in the purchase of a vehicle of this type is the amount of useable space that is available inside the vehicle. Thus, it is desirable that the mechanism for extending and retracting the room take up a minimum of space.

The prior art for expanding and retracting expandable rooms generally employs hydraulic arms that are housed inside the vehicle or under the floor of the vehicle. The hydraulic arms contained within the vehicle require a housing unit when they are in their retracted position. This housing unit remains intact when the room is extended taking up space within the vehicle. The hydraulic arms that are housed under the floor are generally complex, relatively expensive, and may be unduly heavy. Further, when the room is in the retracted position, otherwise available storage space under the floor is lost. The additional weight also adversely affects the fuel economy of the vehicle. With the highly competitive market in these recreational vehicles, not only weight and space but also cost and reliability of operation are important factors.

Examples of improved types of linkage utilized in these expandable rooms are disclosed in co-pending patent applications Ser. No. 09/628874 filed Oct. 26, 2001 and entitled "Straight Motion Parallelogram Linkage", and Ser. No. 10/065509 filed Oct. 25, 2002 and entitled "Linkage for Expandable Rooms". It is the object of this invention to provide another type of mechanism for expanding rooms for vehicles which mechanism is reliable in use, lightweight, has fewer components and which will allow for maximum space inside the vehicle. It is a further object to provide a scissor type linkage that provides for motion of structural members together or away from one another in a substantially linear path without substantial movement of the members in a direction perpendicular to said path. It is a further object to provide a mechanism for the expansion and retraction of expandable rooms or structures when the rooms or structures are not designed for convenient housing of the mechanism in the floor. Finally, it is an object of the present invention to provide a mechanism wherein a force assist means such as, for example, a hydraulic cylinder, electric drive, or pneumatic control system can be used to drive the movement of a push-pull chain that in turn moves an expandable room, and if needed, such a chain can be provided on both sides of the room and synchronized.

SUMMARY OF INVENTION

The present invention includes a push-pull drive chain mechanism that can be powered by a hydraulic cylinder, electric drive or pneumatic or other similar control system, to affect the coordinated linear movement of an expandable room in a recreational vehicle. The drive chain moves generally vertically along a first structural member, such as a vehicle frame member, as the hydraulic cylinder extends or retracts to move the expandable room relative to the vehicle frame. The drive chain is pivotally connected at the proper place on the structural members, and in a preferred embodiment the chain is connected to one link of a scissors-type linkage assembly, the links that form the scissors extending and crossing between points of pivotal attachment with a structural member of the vehicle body and a second structural member of the expandable room. The drive chain is constructed and guided to provide the required force for opening and closing the scissors assembly.

There may be a scissors linkage assembly and drive chain mechanism on each side of the expandable room, each linkage assembly having a first link attached at one end to a vehicle frame member and at its other end to a structural member of the expandable room. The other link of the scissors linkage assembly is pivotally attached at one end to the vehicle frame member and at the other end to a structural member of the expandable room, the links crossing and being pivotally connected midway between their ends. The drive chain mechanism for each of the linkage assemblies is then attached to one of the links to expand or collapse the assembly and cause the expandable room to extend or retract. Use of two linkage assemblies, one on each side of the expandable room, improves the mechanical advantage in moving the expandable room inwardly and outwardly. Preferably, a torsion bar interconnects the linkage assemblies to equalize the pressures on the assemblies and thereby assure smooth, synchronized operation.

BRIEF DESCRIPTION OF DRAWINGS

FIG. 2 is an interior side view similar to FIG. 1 but showing the expandable room extended and the linkage assembly retracted;

FIG. 3 is an end view showing the linkage assembly on one side of the expandable room;

FIG. 4 is a sectional view of a portion of the assembly taken on the line 4—4 of FIG. 2 and showing a vehicle frame and expandable room member when the linkage assembly is retracted;

FIG. 5 is a sectional view of a portion of one of the links taken on the line 5—5 of FIG. 1 and showing the connection to the pivot plate that is attached to the expandable room;

FIG. 6 is a sectional view of a portion of the other link taken on the line 6—6 of FIG. 1 and showing the connection to the vehicle frame;

FIG. 7 is a sectional view of a portion of one of the links taken on the line 7—7 of FIG. 1 and showing the pivotal connection to the expandable room structure;

DETAILED DESCRIPTION

Figure 1:
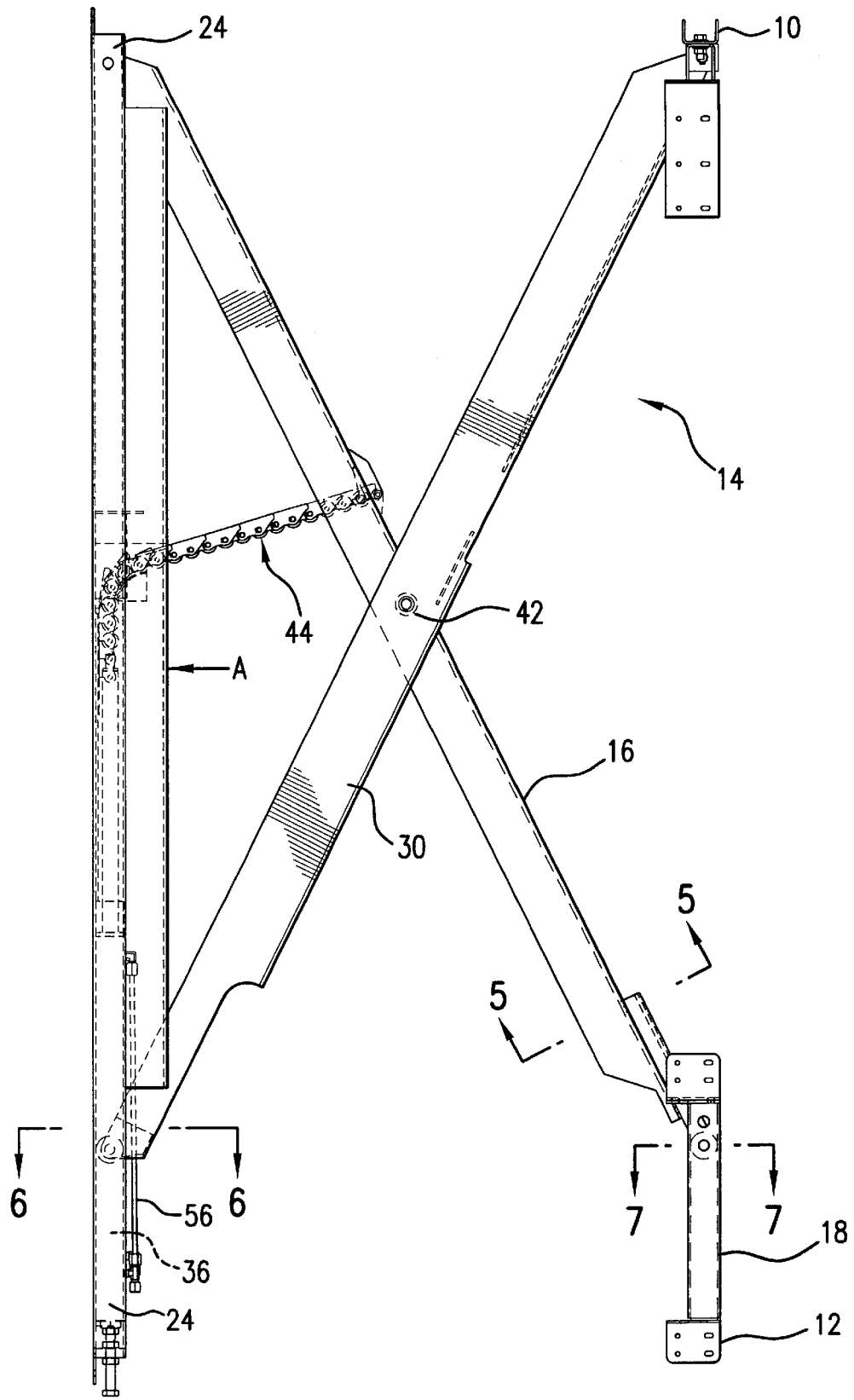
FIG. 1 is an interior side view of the scissors linkage assembly for an expandable room and showing the linkage when the room is retracted.
Figure 8:
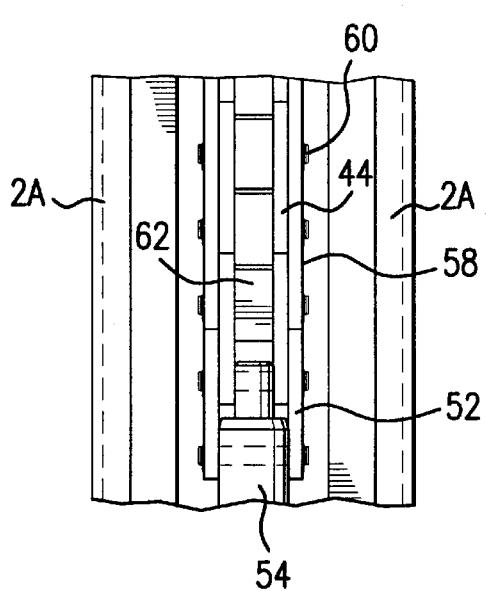
FIG. 8 is an end elevational view looking in the direction of the arrow A of FIG. 1 and showing the drive chain.

Referring first to FIGS. 1, 2 and 3, there is illustrated a portion of the framework for an expandable room for a recreational vehicle which, as is well know to those skilled in the art, has an opening formed in its side wall to accommodate an expandable room having an upper frame member 10 and a lower frame member 12 that form a part of the interior end wall of the expandable room. An example of an expandable room for a recreational vehicle is shown in U.S. Pat. No. 6,067,756. Such expandable rooms of various sizes are well know to those skilled in the art and therefore additional details of the vehicle and room will not be described. FIG. 2 shows the expandable room structure in its extended position so that there will be additional living or storage space inside the recreational vehicle when the vehicle is stationary, such as at a campsite. As is well known to those skilled in the art, when the vehicle is traveling over the road, the expandable room is retracted so that the outer end wall of the expandable room formed is generally flush with an exterior wall (not shown) of the recreational vehicle. FIG. 2 shows the expandable room structure in the extended position with the frame members 10 and 12 that form the interior end wall of the expandable room positioned adjacent the vehicle frame members. As is also well known to those skilled in the art, the expandable room typically extends outwardly from a side wall of the recreational vehicle.

FIGS. 1 and 2 show a scissors-type linkage mechanism for extending and retracting the expandable room. Although use of the scissors linkage is the preferred way of utilizing the principles of the invention, it should be understood that the drive chain mechanism described hereinafter could be suitably attached directly to a rigid frame member of the expandable room. In either event, there may be a drive chain mechanism on each side of the room, and in some applications, it may be necessary to use only a single mechanism on one side. Therefore, only one of the drive chain mechanisms will be described in detail and will be described as used in connection with a scissors-type linkage assembly as used in connection with an expandable room for a recreational vehicle. It will be also understood, however, that these mechanisms and linkage assemblies can be used in other applications where it is desired repeatedly to move and retract a large object along a limited linear distance.

FIG. 1 shows the linkage assembly, indicated generally by the reference numeral 14, in the extended position with the room structure retracted while FIG. 2 shows the linkage assembly 14 in the retracted position with the expandable room structure extended. The linkage assembly 14 is comprised of a first link 16 secured by suitable fasteners such as bolts 17 to a pivot plate 19 (FIG. 5) that in turn is pivotally attached at its lower end by pin 20 to rollers 22 that roll inside a vertically extending frame member 18. Frame member 18 is affixed to the lower frame member 12 which forms a part of the structure for the interior end wall of the expandable room. As best seen in FIG. 7, frame member 18 is a channel-type member open along one side to receive the pin 20 and rollers 22. Pin 20 pivotally connects the pivot plate 19 and thus the link 16 to the frame member 18 through rollers 22. The upper end of the first link 16 is pivotally attached to the upper end of the vertical structural member 24 of the vehicle body. As best seen in FIG. 4, the link 16 is pivotally attached by a pivot pin 26 turnable in bushings 28 in the structural member 24. The linkage assembly 14 also includes a second link 30 pivotally attached at its lower end to rollers 34 rollable inside the lower end of the vertical structural member 24 of the vehicle body. As best seen in FIG. 6, link 30 is turnable on pivot pins 32 each of which support a roller 34. Two pivot pins 32 are used so that the central portion of the structural member 24 is open to received a hydraulic cylinder 36 (not shown in FIG. 6). The second link 30 has its upper end pivotally connected to the upper frame member 10 of the expandable room. As best seen in FIG. 4, link 30 is turnable on a pivot pin 38 mounted to the upper frame member 10 in bushings 40. The second link 30 intersects and is pivotally connected to the first link 16 at their respective centers by a pivot pin 42 to form the scissors linkage assembly 14.

Figure 10:
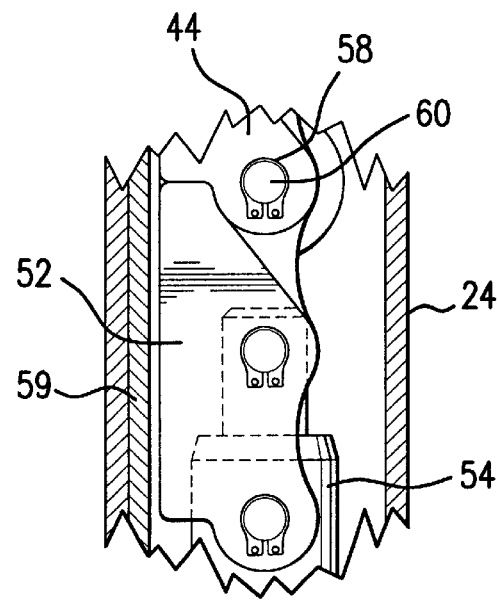
FIG. 10 is an enlarged view showing the connection of the drive chain to the operating rod of the hydraulic cylinder, with the frame member broken away for clarity.
Figure 9:
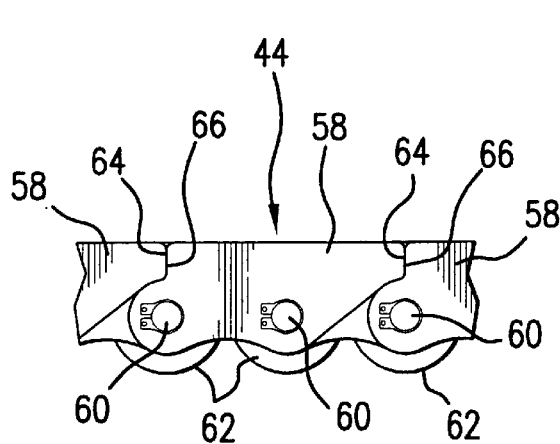
FIG. 9 is an enlarged view of a portion of the drive chain.
Figure 11:
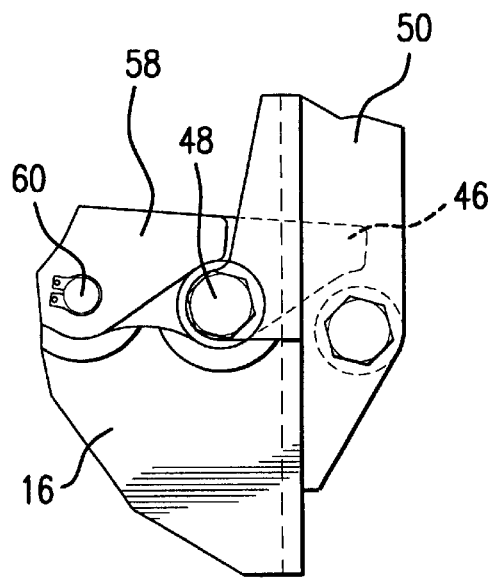
FIG. 11 is an enlarged view of the drive chain connection to the link of the scissors linkage assembly.

The linkage assembly 14 is expanded and collapsed by a chain drive mechanism shown in FIGS. 1–3 and in detail in FIGS. 8–11. A drive chain, indicated generally by the reference numeral 44, has one end attached to link 16 at a point above the pivotal connection of link 16 with link 30. FIG. 11 is an enlarged view of the connection when viewed from the side and shows the end link 46 secured by bolt 48 to the link 16. A bracket 50 reinforces the connection. The end link 52 at the other end of drive chain 44 is affixed to the end of the operating rod 54 of the hydraulic cylinder 36 as shown in FIG. 10. Hydraulic cylinder 36 is mounted vertically inside the vertical structural member of the vehicle body and is suitably connected to the hydraulic system of the vehicle by hydraulic line 56. The end link 52 is also secured to the operating rod 54 of the hydraulic cylinder 36 so that the link 52 remains rigid when the hydraulic cylinder 36 extends and retracts. As shown in FIG. 10, a guide plate 59 is mounted inside the structural member 24 for easy movement and for guiding the links 58 of the drive chain 44. The drive chain 44 is comprised of consecutive links 58 pivotally connected to each other by pins 60 and extending between the end links 46 and 52. Each chain link 58 has a pair of rollers 62 held by the pins 60 and extending from the drive chain 44. Rollers 62 facilitate movement of the chain 44 as it bends outwardly from the structural member 24 toward the first link 16 of the linkage assembly 14. As suitable guide member (not shown) can be secured to the structural member 24 at the place where the chain 44 exits. As best seen in FIG. 9, the links 58 of the drive chain 44 each have a forward flat edge 64 that engages with a corresponding rear edge 66 of the adjacent link 58. The edges 64 and 66 allow the drive chain 44 to flex in one direction only so that the links 58 provide a rigid configuration with any two consecution links thereby allowing the chain to be pushed from one end link 52 with the pushing force carried by the chain links 58 to the other end link 46. The chain can thus be pushed or pulled, and by its connection with the linkage assembly 14 as described, will cause the assembly to expand or collapse. Because the linkage assembly is pivotally connected between the structural members of the expandable room and the vehicle body, pushing of the drive chain 44 by the hydraulic cylinder 36 will expand the linkage assembly 14 and cause the expandable room to retract into the vehicle body as shown in FIG. 1. Similarly, when the drive chain 44 is pulled by the hydraulic cylinder 36, the linkage assembly 14 will collapse and extend the expandable room away from the vehicle body as shown in FIG. 2.

In a preferred arrangement, there are a pair of linkage assemblies 14 on each side of the expandable room. In order to synchronize movement of the assemblies 14 on opposite sides of the room and therefore maintain proper alignment of the expandable room relative to the exterior wall of the vehicle, there may be provided a torsion bar suitably connected to the structural members of the vehicle body and the expandable room. With such an arrangement, if one side of the expandable room advances ahead of the other side, the torsion bar will twist and slow down the faster side to allow the slower side to "catch up" and thus equalize the pressure. Although the use of a torsion bar is a simple way of equalizing the pressure, a synchronizing cylinder in the hydraulic system can be used for the same purpose or a synchronizing system using electronics can also be employed, all as is well known to those skilled in the art.

Although the preferred embodiment as described herein includes reference to a force assist element in the form of hydraulic cylinders, the present invention can also employ a pneumatic cylinder and system or an electrically powered motor to drive the drive chain. Also, it is possible not to employ any force assist element, in which case the room would be manually pushed or pulled using the principles of the invention. Of course, the linkage assembly 14 could be reversed with mounting of the hydraulic cylinder 36 in the structural members of the expandable room. Also, the hydraulic cylinder 36 may be inverted from the position shown in the drawings with the drive chain 44 secured to the first link 16 near its lower end. Mounting the mechanism to a vehicle frame member in the manner illustrated is preferred since this arrangement requires less space.

Having described the invention in reference to the preferred embodiments thereof, it will be understood by those skilled in the relevant art that various modifications and revisions may be made and that such modifications and revisions are intended to be within the scope of the invention as claimed below.

What is claimed is:

1. A linkage assembly for horizontally moving an expandable room structure between a retracted position within a vehicle and an extended position protruding outwardly from a wall of the vehicle without substantially moving the expandable room vertically relative to the vehicle, the linkage assembly comprising:

a vehicle wall structure including top and bottom structural members;

an expandable room structure including top, bottom and side structural members that define an interior end wall disposed generally parallel to the vehicle wall and side walls extending generally perpendicular to the end wall;

a first linkage member pivotally connected at one end to the vehicle wall structure and at the other end to the expandable room structure at a point substantially lower than the pivot connection to the vehicle wall structure;

a second linkage member pivotally connected at one end to the expandable room structure at a point substantially higher than the pivot connection of the first linkage member to the expandable room structure and at the other end to the vehicle wall structure at a point substantially lower than the pivot connection of the first linkage member to the vehicle wall structure;

the first and second linkage members crossing each other at a point between their respective ends and being pivotally connected to each other at the point of crossing;

a drive chain having a plurality of pivotally connected links extending between end links, the links being capable of pivoting in one direction only thereby providing for the chain to be pulled by tensile forces applied to the end links or pushed by compressive forces applied to the end links; and a power device combined with the vehicle structure and operatively connected to one of the end links of the drive chain for pulling and pushing the chain, the other end link being operatively connected to the first or second linkage member, whereby actuation of the power device causes the linkage members to pivot and move the expandable room between retracted and extended positions.

2. The linkage assembly of claim 1 in which the power device is a hydraulic cylinder.

3. The linkage assembly of claim 1 in which there are a pair of linkage members combined with the vehicle wall on each side of the expandable room, each pair being comprised of the first linkage member, the second linkage member, the drive chain and the power device.

4. The linkage assembly of claim 3 in which the linkage assemblies are operatively connected by a torsion bar to synchronize movement of the sides of the expandable room and thereby maintain proper alignment of the room relative to the vehicle wall.

5. The linkage assembly of claim 1 in which the first linkage member is pivotally connected to the top structural member of the vehicle structure and pivotally and rollably connected to the bottom structural member of the interior end wall of the expandable room structure, and the second linkage member is connected to the top structural member of the interior end wall of the expandable room structure and pivotally and rollably connected to the bottom structural member of the vehicle structure, the linkage members crossing each other at a point that is midway between their respective ends.

6. The linkage assembly of claim 5 in which there are rollers movable up and down along the bottom structural member of the interior end wall of the expandable room structure and the bottom structural member of the vehicle structure, the first and second linkage members being pivotally connected to the rollers.

7. The linkage assembly of claim 1 in which each link of the chain drive has a forward flat edge and a rear flat recess, the forward flat edge of each link being engageable with the rear flat recess of the adjacent link to limit pivot movement of adjacent links so that the drive chain flexes in one direction only.

* * * * *